United States Patent
Kim

(10) Patent No.: US 10,024,263 B2
(45) Date of Patent: Jul. 17, 2018

(54) DEVICE FOR MEASURING TEMPERATURE OF TURBINE WHEEL IN TURBOCHARGER AND ENGINE CONTROL METHOD USING TEMPERATURE MEASUREMENT DEVICE FOR TURBINE WHEEL

(71) Applicant: HYUNDAI MOTOR COMPANY, Seoul (KR)

(72) Inventor: Han Sang Kim, Ansan-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 6 days.

(21) Appl. No.: 15/263,867

(22) Filed: Sep. 13, 2016

(65) Prior Publication Data

US 2017/0335782 A1 Nov. 23, 2017

(30) Foreign Application Priority Data

May 23, 2016 (KR) .......................... 10-2016-0062894

(51) Int. Cl.

| | |
|---|---|
| *F02D 41/22* | (2006.01) |
| *F02B 37/00* | (2006.01) |
| *F02D 41/00* | (2006.01) |
| *F02D 41/26* | (2006.01) |
| *F02D 41/30* | (2006.01) |
| *G01J 5/00* | (2006.01) |
| *G01J 5/06* | (2006.01) |

(Continued)

(52) U.S. Cl.
CPC .............. *F02D 41/22* (2013.01); *F02B 37/00* (2013.01); *F02D 41/0007* (2013.01); *F02D 41/10* (2013.01); *F02D 41/1447* (2013.01); *F02D 41/1475* (2013.01); *F02D 41/26* (2013.01); *F02D 41/3005* (2013.01); *G01J 5/0088* (2013.01); *G01J 5/06* (2013.01); *G01J 5/0818* (2013.01); *G01J 5/10* (2013.01); *G01K 11/00* (2013.01); *F02D 2041/228* (2013.01); *F02D 2200/0404* (2013.01); *F02D 2200/602* (2013.01); *G01J 2005/065* (2013.01); *Y02T 10/144* (2013.01)

(58) Field of Classification Search
CPC ...... F02D 41/22; F02D 41/0007; F02D 41/26; F02D 41/3005; F02D 2041/228; G01J 5/0088; G01J 5/06; G01J 5/10; G01J 5/0818; G01J 2005/065; F02B 37/00
See application file for complete search history.

(56) References Cited

U.S. PATENT DOCUMENTS 3,623,368 A * 11/1971 Decker, Jr. ............ F01D 17/085
                                                       356/44
8,627,714 B2    1/2014 Christmann
(Continued)

FOREIGN PATENT DOCUMENTS

| JP | H11-183257 A | 7/1999 |
|---|---|---|
| JP | 4589751 B2 | 9/2010 |
| KR | 10-2015-0114384 A | 10/2015 |

*Primary Examiner* — Joseph Dallo
(74) *Attorney, Agent, or Firm* — Brinks Gilson & Lione

(57) ABSTRACT

A device for measuring temperature of a turbine wheel in a turbocharger includes: a guide that passes infrared ray generated from the turbine wheel and includes a coolant path; a protection unit that protects an optical head which senses the infrared ray; and a signal processing unit that measures a temperature of the turbine wheel by processing a signal corresponding to the sensed infrared ray.

6 Claims, 5 Drawing Sheets

(51) Int. Cl.
*G01J 5/08* (2006.01)
*G01J 5/10* (2006.01)
*F02D 41/10* (2006.01)
*F02D 41/14* (2006.01)
*G01K 11/00* (2006.01)

(56) References Cited

U.S. PATENT DOCUMENTS

2013/0067911 A1* 3/2013 Worden .............. F02D 41/0085
    60/598
2015/0252748 A1* 9/2015 Glugla ................ F02D 41/0087
    123/295

* cited by examiner

DEVICE FOR MEASURING TEMPERATURE OF TURBINE WHEEL IN TURBOCHARGER AND ENGINE CONTROL METHOD USING TEMPERATURE MEASUREMENT DEVICE FOR TURBINE WHEEL

CROSS-REFERENCE TO RELATED APPLICATION

This application claims priority to and the benefit of Korean Patent Application No. 10-2016-0062894, filed on May 23, 2016, the entire contents of which are incorporated herein by reference.

FIELD

The present disclosure relates to a turbocharger of a vehicle, and more particularly, to a device for measuring temperature of a turbine wheel in a turbocharger and an engine control method using the temperature measurement device for the turbine wheel.

BACKGROUND

The statements in this section merely provide background information related to the present disclosure and may not constitute prior art.

Generally, a power generated by an engine in a vehicle is dependent on an air amount and a fuel amount flowing into a combustion chamber. In other words, more air and fuel should be supplied into the combustion chamber in order to increase an output of the engine. In order to supply more air and fuel, size of the combustion chamber should be increased. However, because the size of the combustion chamber is increased, weight and size of the engine can be increased. In order not to increase the weight and size of the engine, a turbocharger that can increase the output of the engine is used. In more detail, if a pressure of intake air that is sucked into a cylinder of the engine is higher than an atmospheric pressure and an amount of air in the cylinder is increased, the engine output per cycle can be increased.

An exhaust gas rotates a turbine wheel of the turbocharger and a wheel of an air compressor connected to a shaft that is connected to the turbine wheel is rotated to provide a compressed air into the combustion chamber so that the turbocharger increases the output of the engine. The turbocharger uses the exhaust gas to increases the output of the engine, thereby obtaining enhanced fuel efficiency, miniaturization of the engine, and reduction of toxic substances.

The turbocharger is widely used in a diesel engine that does not generate knocking phenomena rather than a gasoline engine that generates the knocking phenomena if a pressure in the cylinder increases because of supercharging.

In the turbocharger, the turbine wheel that recovers exhaust energy and the compressor wheel that delivers compressed air to the cylinder are disposed on respective ends of the same shaft, and a housing for leading flow of the exhaust gas and the air covers each wheel.

The above information disclosed in this Background section is only for enhancement of understanding of the background of the present disclosure and therefore it may contain information that does not form the prior art that is already known to a person of ordinary skill in the art.

SUMMARY

The present disclosure provides a device for measuring temperature of a turbine wheel in a turbocharger and an engine control method using the temperature measurement device for the turbine wheel.

An exemplary form of the present disclosure may provide the device for measuring temperature of the turbine wheel in the turbocharger, and the device includes: a guide that passes infrared ray generated from the turbine wheel and includes a coolant path; a protection unit that protects an optical head which senses the infrared ray; and a signal processing unit that measures a temperature of the turbine wheel by processing a signal corresponding to the sensed infrared ray.

The protection unit may include a lens that transmits the infrared ray passed through the guide and the lens may include a glass used at an ultra-high temperature.

An exemplary form of the present disclosure may provide the engine control method using the temperature measurement device for the turbine wheel in the turbocharger, including: determining, by a controller, whether a temperature of the turbine wheel measured by the temperature measurement device exceeds a first threshold value; controlling, by the controller, a ratio of a fuel supplied to a cylinder of an engine to be in a rich state when the temperature of the turbine wheel exceeds the first threshold value; and controlling, by the controller, a ratio of the fuel to be in a lean state when the temperature of the turbine wheel is less than or equal to the first threshold value.

The engine control method using the temperature measurement device for the turbine wheel in the turbocharger may further include: controlling, by the controller, a warning lamp that warns a failure of the turbocharger to be lit when a difference between a current temperature of the turbine wheel and a temperature before the current temperature of the turbine wheel is less than or equal to a second threshold value.

The engine control method using the temperature measurement device for the turbine wheel may further include: determining, by the controller, whether a vehicle including the temperature measurement device is in a sudden acceleration condition. When the vehicle is in the sudden acceleration condition, the controlling the warning lamp may be performed.

The engine control method using the temperature measurement device may further include: determining, by the controller, whether a state of a throttle valve that adjusts an amount of air supplied to the cylinder of the engine is a boosting condition that indicates an open of the throttle valve. When the state of the throttle valve is the boosting condition, the determining whether the vehicle is in the sudden acceleration condition may be performed.

The device for measuring temperature of the turbine wheel in the turbocharger and the engine control method using the temperature measurement device according to the exemplary form of the present disclosure may measure the temperature of the turbine wheel, and thus may increase endurance reliability of the turbocharger including the turbine wheel.

The exemplary form of the present disclosure may use the turbocharger parameter such as the turbine wheel temperature to protect the engine by warning the engine failure of the vehicle or implement a control system based on a metal surface temperature of the turbine wheel.

Further, the form of the present disclosure may improve high speed fuel efficiency by performing a lean control for the fuel supplied to the engine combustion chamber (or the engine cylinder).

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
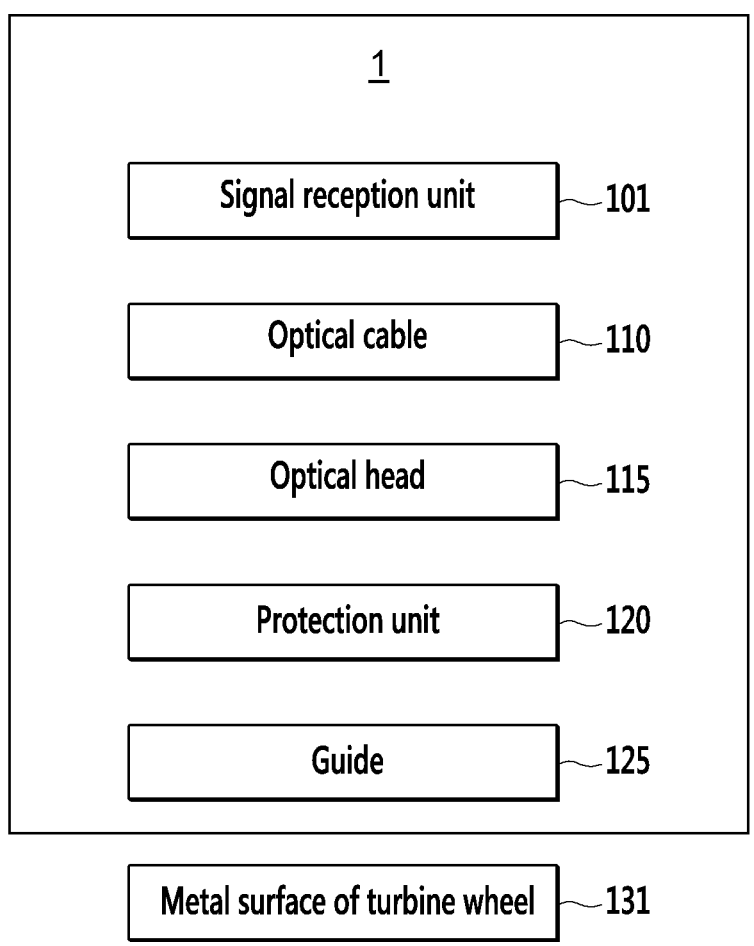
FIG. 1 is a block diagram describing a temperature measurement device 1 for a turbine wheel in a turbocharger according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In describing the present disclosure, well-known configurations or functions will not be described in detail since they may unnecessarily obscure the gist of the present disclosure.

Terms used in the present specification are only used in order to describe specific exemplary forms rather than limiting the present disclosure. Singular forms are to include plural forms unless the context clearly indicates otherwise. It will be further understood that the terms "include" or "have" used in the present specification specify the presence of features, numerals, steps, operations, components, or parts mentioned in the present specification, or a combination thereof, but do not preclude the presence or addition of one or more other features, numerals, steps, operations, components, parts, or a combination thereof.

Throughout this specification and the claims that follow, when it is described that an element is "coupled" to another element, the element may be "directly coupled" to the other element or "electrically or mechanically coupled" to the other element through a third element.

Unless defined otherwise, it is to be understood that the terms used in the present specification including technical and scientific terms have the same meanings as those that are generally understood by those skilled in the art. It must be understood that the terms defined by the dictionary are identical with the meanings within the context of the related art, and they should not be ideally or excessively formally defined unless the context clearly dictates otherwise.

Because of poor lubrication defect according to a foreign material flowing into a turbine of a turbocharger or a high temperature (for example, more than about 950° C.) of an exhaust gas flowing into a front of the turbine, a shaft of a turbine wheel in the turbocharger and a blade of the turbine wheel can be damaged.

A related art cannot evaluate or measure a metal surface temperature of the turbine wheel, and thus cannot prevent damage to the turbine wheel shaft and the turbine wheel blade. Therefore, because a rich control for an air-fuel ratio (A/F) should be unconditionally performed, a fuel efficiency of a vehicle can be degraded at a high speed.

FIG. 1 is a block diagram describing a temperature measurement device for a turbine wheel in a turbocharger according to an exemplary form of the present disclosure. The temperature measurement device may be also referred to as a system for measuring a metal surface temperature of a turbine wheel included in a turbocharger of a vehicle.

Referring to FIG. 1, the temperature measurement device 1 includes a signal reception unit (or a signal receiver) 101 included in a signal processing unit (100 of FIG. 2), an optical cable 110 such as a glass fiber cable, an optical head 115 connected to the signal reception unit 101 via the optical cable 110, a protection unit 120, and a guide 125. The temperature measurement device may be referred to as an infrared radiation sensor that is a pyrometer. The infrared radiation sensor may use a laser beam to focus a lens included in the radiation sensor and may measure a temperature of up to about 1700° C.

The guide 125 may pass infrared ray generated from a metal surface 131 (or a red spot on the metal surface) of a turbine wheel (130 in FIG. 2) and may include a coolant path such as a water jacket. The guide 125 may also pass an exhaust gas that flows into the guide through the turbine wheel. A temperature of the exhaust gas may be, for example, about 950° C. The guide 125 may take form of a cylinder.

The protection unit 120 may protect the optical head 115 which senses the infrared ray. The protective unit 120 or the optical head 115 may take form of a cylinder.

The signal processing unit 100 (or a signal processor) may measure (or evaluate) a temperature of the turbine wheel by processing (or analyzing) a signal corresponding to the sensed infrared ray that is received via the signal reception unit 101. The signal processing unit may control the measured temperature of the turbine wheel to be displayed on a display device included in the temperature measurement device.

Figure 2:
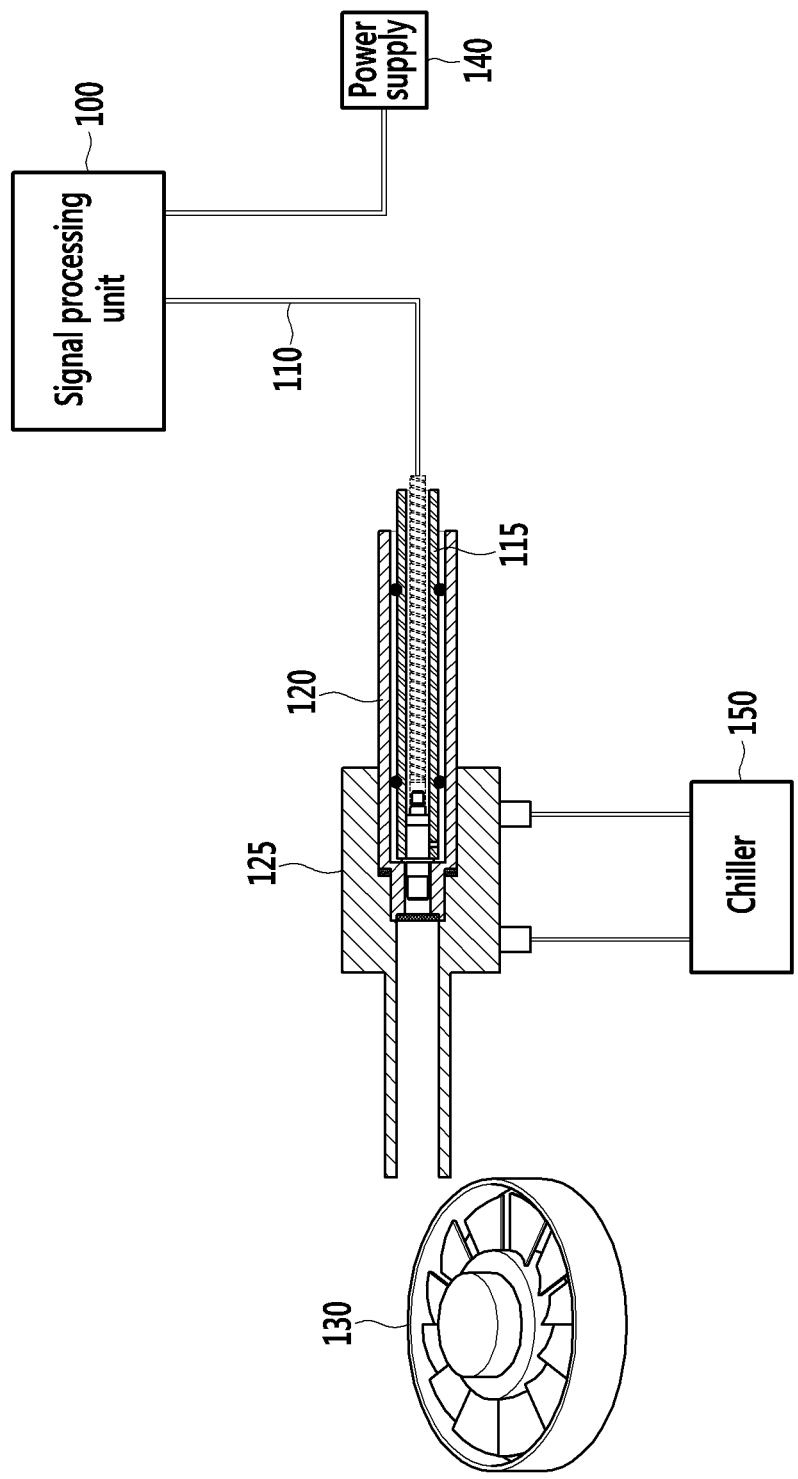
FIG. 2 is a view explaining an exemplary form of the temperature measurement device shown in FIG. 1.

FIG. 2 is a view explaining an exemplary form of the temperature measurement device shown in FIG. 1.

Referring to FIGS. 1 and 2, the temperature measurement device 1 may further include a power supply 140 connected to the signal processing unit 100 and a chiller (or a cooler) 150.

The chiller 150 may generate a coolant (e.g., water) for cooling the guide 125 to supply the coolant to the guide 125.

Figure 3:
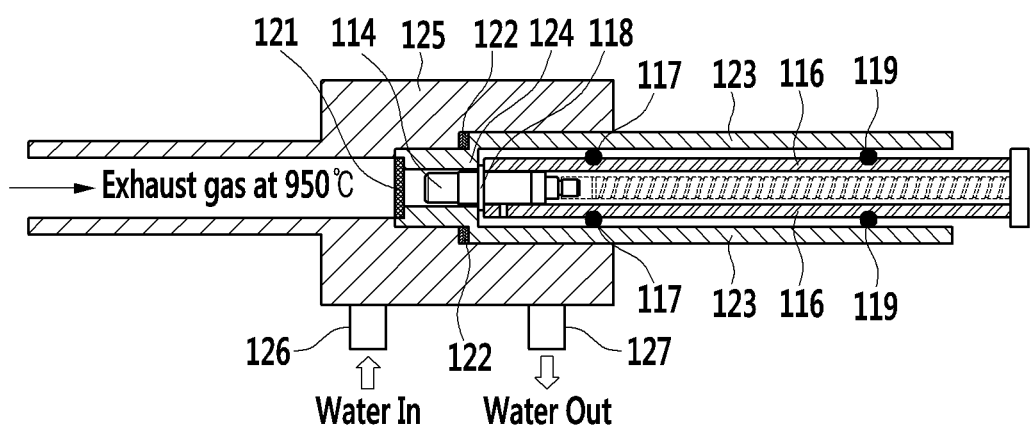
FIG. 3 is a view (a longitudinal sectional view) for explaining one form of an optical head, a protection unit, and a guide shown in FIG. 2.
Figure 4:
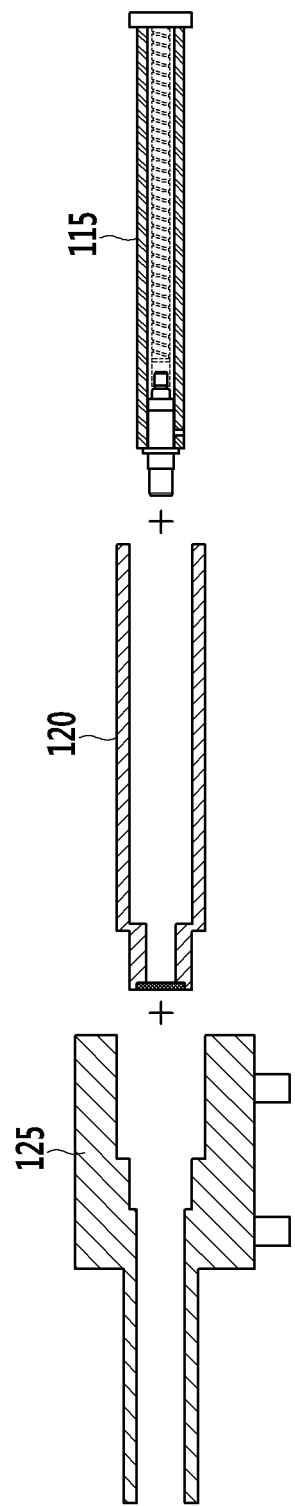
FIG. 4 is an exploded view of a device including the optical head, the protection unit, and the guide shown in FIG. 3.

FIG. 3 is a longitudinal sectional view for explaining one form of the optical head 115, the protection unit 120, and the guide 125 shown in FIG. 2. FIG. 4 is an exploded view of a device including the optical head, the protection unit, and the guide shown in FIG. 3.

Referring to FIGS. 2-4, the optical head 115 includes a fixed probe 116 that fixes an optical head unit 114, a fixing nut 118 that fixes the optical head 115 to the protection unit 120, and o-rings 117 and 119 that fix the optical head to the inside of the protection unit 120. The optical head unit 114 may sense the infrared ray. In another form of the present disclosure, the optical head unit 114 may include a lens.

The protection unit 120 includes a lens 121 such as an ultra-high temperature lens and an optical probe 123. The lens 121 may transmit the infrared ray passed (or provided) through the guide 125 and may include a glass that is used at an ultra-high temperature and withstands approximately 2000° C. The lens 121 may be bonded to a front of the optical probe 123 that is a body of the protecting unit 120 by using an ultra-precision bonding method that is a special bonding method and is used in bonding between a glass and a steel use stainless (SUS). The optical probe 123 may include a material (for example, a steel use stainless (SUS) material) that can withstand approximately 1700° C. and 3000 bar. A screw thread 124 for fixing the optical head 115 to the protection unit 120 may be formed in an upper portion of the optical probe 123.

The guide 125 may include the water jacket (not shown) and nipples 126 and 127 that are connected to a cooling hose (not shown).

A washer 122 such as a copper washer may be disposed between an upper portion of the protective unit 120 and the guide 125.

Figure 5:
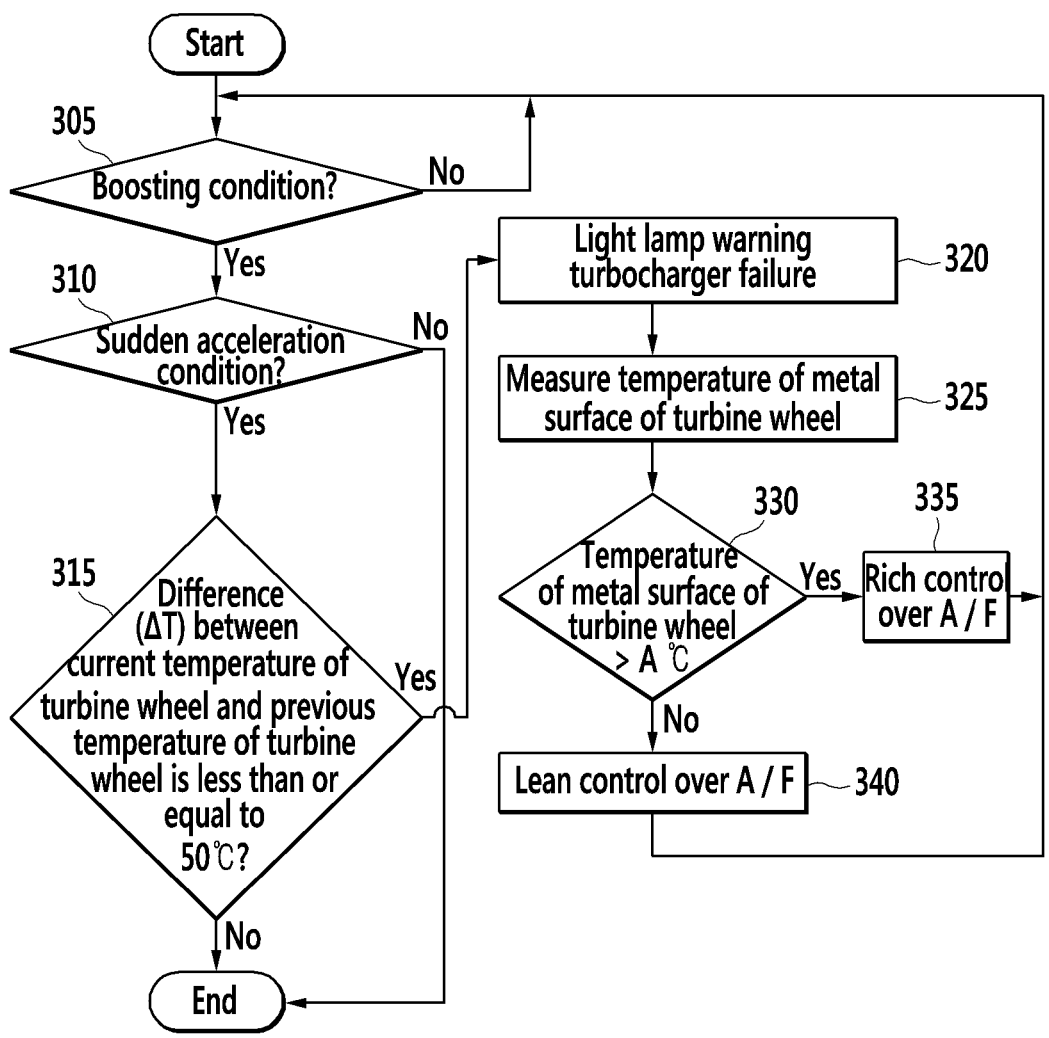
FIG. 5 is a flowchart describing an engine control method using the temperature measurement device according to one form of the present disclosure.

FIG. 5 is a flowchart describing an engine control method using the temperature measurement device according to the exemplary form of the present disclosure. The temperature measurement device may be the device shown in FIG. 1.

Referring to FIG. 5, in a determination step 305, a controller may determine whether a state of a throttle valve that adjusts (or controls) an amount of air supplied to a cylinder of an engine is a boosting condition that indicates an open (an opening) of the throttle valve. In more detail, the controller may use an output signal from a throttle position sensor to determine whether a pressure at a rear of a compressor is, for example, more than about 1.1 bar. In the turbocharger that improves the engine output, when exhaust energy from the exhaust gas rotates the turbine wheel of an exhaust gas turbine, the compressor directly connected to the exhaust gas turbine may push air in the engine cylinder. The compressor wheel may be connected to the turbine wheel of the turbocharger.

For example, the controller may be one or more microprocessors operated by a program or hardware including the microprocessor. The program may include a series of commands for executing the engine control method using the temperature measurement device according to an exemplary form of the present disclosure. The controller may control an entire operation of the vehicle including the temperature measurement device.

When it is determined in the determination step 305 that the boosting condition is satisfied, a process that is the engine control method using the temperature measurement device proceeds to a determination step 310.

According to the determination step 310, the controller may determine whether the vehicle (or the engine of the vehicle) is in a sudden acceleration condition by using an output signal from an acceleration pedal position sensor (APS) of the vehicle. The sudden acceleration condition may be, for example, a condition in which an open value (an opening value) of the throttle valve is approximately 90% or more. The APS may continuously measure a position value of an accelerator pedal. The position value of the accelerator pedal may be 100% when the accelerator pedal is fully depressed and the position value of the accelerator pedal may be 0% when the accelerator pedal is not depressed.

When it is determined in the determination step 310 that the sudden acceleration condition is satisfied, the process proceeds to a comparison step 315.

According to the comparison step 315, the controller may determine whether a difference ΔT between a current temperature of the turbine wheel (or the metal surface of the turbine wheel) and a temperature immediately before the current temperature of the turbine wheel is less than or equal to a second threshold value (for example, approximately 50° C.). A temperature measurement time interval of the temperature measurement device may be, for example, approximately 0.01 or 0.001 second.

A sudden drop in the temperature of the turbine wheel (or the metal surface of the turbine wheel) may be due to a bearing failure in the turbocharger or an oil leak according to an oil ring failure in the turbocharger. When the temperature of the turbine wheel is evaluated (measured) every 1 ms, a change of temperature of more than approximately 10° C. in the metal surface temperature of the turbine wheel may not be possible.

When it is determined in the determination step 315 that the difference between the current temperature of the turbine wheel and the temperature immediately before the current temperature of the turbine wheel is less than or equal to the second threshold value, the process proceeds to a step 320.

According to the step 320, the controller may control a warning lamp that warns a failure of the turbocharger to be lit because there is a sudden temperature drop. The lit warning lamp may be provided to the vehicle driver so that the driver may take action to inhibit or prevent the engine failure. The action may be, for example, the vehicle deceleration action by the driver.

According to a measurement step 325, after the step 320, the controller may use an output signal (or a measured signal) from the temperature measurement device to measure the metal surface temperature of the turbine wheel.

According to a comparison step 330, the controller may determine whether the metal surface temperature of the turbine wheel measured by the temperature measurement device exceeds a first threshold value "A". The temperature measurement device may include the guide that passes infrared ray generated from the turbine wheel and includes the coolant path and the protection unit that protects the optical head which senses the infrared ray.

The "A" value may be approximately 870° C. when the turbine wheel includes Inconel material and may be approximately 920° C. when the turbine wheel includes MAR material. When the metal surface temperature (for example, approximately 1500° C.) exceeds the first threshold value, the process proceeds to a control step 335. When the metal surface temperature is less than or equal to the first threshold value, the process proceeds to a control step 340.

The temperature of the exhaust gas may be, for example, approximately 950° C. However, the metal surface temperature may exceed the first threshold value (e.g., approximately 870° C.) according to the vehicle operating condition or structure of a scroll unit of the turbocharger. The scroll unit may mean a path that is disposed between a housing that covers the turbine wheel and the turbine wheel and that passes the exhaust gas.

The form of the present disclosure may be a control which is not based on the exhaust gas temperature and is based on the metal surface temperature. The engine may be controlled by measuring the exhaust gas temperature and the metal surface temperature, but a control based on measurement of the metal surface temperature of the turbine wheel that is an important element of the turbocharger may be more efficient in terms of control and cost.

According to the control step 335, the controller may perform a rich control (or a rich mode control) for an air-fuel ratio (A/F) of the engine. In more detail, the controller may control a ratio (or a weight ratio) of a fuel supplied to the cylinder of the engine in the vehicle to be in a rich state. For example, the controller may control the ratio of the fuel in the A/F to be rich by approximately 0.1 by using about 14.5:1 as a reference value. When the rich control is performed (i.e., when the A/F is controlled to be in the rich state), the temperature of the exhaust gas discharged from the engine may be lowered. Thus, durability of the turbocharger may be increased by inhibiting or preventing damage to the turbine wheel.

According to the control step 340, the controller may perform a lean control (or a lean mode control) for an air-fuel ratio (A/F) of the engine. In more detail, the controller may control a ratio (or a weight ratio) of a fuel supplied to the cylinder of the engine to be in a lean state.

For example, the controller may control the ratio of the fuel in the A/F to be lean by approximately 0.1 by using about 14.5:1 as a reference value. When the lean control is performed, the temperature of the exhaust gas discharged from the engine may increase. Thus, high speed fuel efficiency (or high speed driving fuel efficiency) may be improved.

The components, "~ unit", block, or module which are used in the present exemplary form may be implemented in software such as a task, a class, a subroutine, a process, an object, an execution thread, or a program which is performed in a predetermined region in the memory, or hardware such as a field programmable gate array (FPGA) or an application-specific integrated circuit (ASIC), and may be performed with a combination of the software and the hardware. The components, '~ part', or the like may be embedded in a computer-readable storage medium, and some part thereof may be dispersedly distributed in a plurality of computers.

As set forth above, exemplary forms have been disclosed in the accompanying drawings and the specification. Herein, specific terms have been used, but are just used for the purpose of describing the present disclosure and are not used for qualifying the meaning or limiting the scope of the present disclosure. Therefore, it will be understood by those skilled in the art that various modifications and equivalent exemplary forms are possible from the present disclosure. Accordingly, the actual technical protection scope of the present disclosure must be determined by the spirit of the present disclosure.

DESCRIPTION OF SYMBOLS

100: signal processing unit
115: optical head
120: protection unit
125: guide
130: turbine wheel

What is claimed is:

1. A device for measuring temperature of a turbine wheel in a turbocharger of a vehicle, the device comprising:
   a guide forming a housing of the device and configured to pass infrared ray generated from the turbine wheel, the housing including inlet and outlet ports configured to flow coolant through a coolant path formed in the guide;
   a protection unit that protects an optical head configured to sense the infrared ray; and
   a signal processing unit that measures a temperature of the turbine wheel by processing a signal corresponding to the sensed infrared ray.

2. The device of claim 1, wherein the protection unit includes a lens that transmits the infrared ray passed through the guide and the lens includes a glass configured to withstand approximately 2000° C.

3. An engine control method of a vehicle including a turbocharger, the method comprising:
   determining, by a controller, whether a temperature of a turbine wheel of the turbocharger measured by a temperature measurement device exceeds a first threshold value;
   controlling, by the controller, a ratio of a fuel supplied to a cylinder of an engine to be in a rich state when the temperature of the turbine wheel exceeds the first threshold value; and
   controlling, by the controller, a ratio of the fuel to be in a lean state when the temperature of the turbine wheel is less than or equal to the first threshold value,
   wherein the controlled rich and lean states cause a change to the temperature of the turbine wheel.

4. The method of claim 3, further comprising:
   controlling, by the controller, a warning lamp that warns a failure of the turbocharger to be lit when a difference between a current temperature of the turbine wheel and a temperature measured at a predetermined time before the current temperature of the turbine wheel is less than or equal to a second threshold value.

5. The method of claim 4, further comprising:
   determining, by the controller, whether the vehicle is in a sudden acceleration condition,
   wherein when the vehicle is in the sudden acceleration condition, the controlling the warning lamp is performed.

6. The method of claim 5, further comprising:
   determining, by the controller, whether a state of a throttle valve configured to adjust an amount of air supplied to the cylinder of the engine is in an open condition,
   wherein the step of determining the state of the throttle valve is performed before the step of determining the sudden acceleration condition.

* * * * *